United States Patent [19]

Durbin et al.

[11] 4,377,647

[45] Mar. 22, 1983

[54] POLYMER BLEND COMPOSITION

[75] Inventors: Daniel P. Durbin, Houston; Richard L. Danforth, Missouri City; Robert G. Lutz, Spring, all of Tex.

[73] Assignee: Shell Oil Company, Houston, Tex.

[21] Appl. No.: 321,647

[22] Filed: Nov. 16, 1981

[51] Int. Cl.³ .................. C08K 5/01; C08F 293/00; C08L 67/00
[52] U.S. Cl. .................. 523/518; 525/92; 525/901; 523/522
[58] Field of Search .............. 524/505; 525/92, 901; 523/518, 522

[56] References Cited

U.S. PATENT DOCUMENTS

| | | | |
|---|---|---|---|
| 2,769,804 | 11/1956 | Hansen | 260/86.7 |
| 2,914,505 | 11/1959 | Roper et al. | 260/45.5 |
| 2,971,939 | 2/1961 | Baer | 260/45.5 |
| 3,336,267 | 8/1967 | Zimmerman et al. | 260/78.5 |
| 3,641,212 | 2/1972 | Narayana et al. | 260/893 |
| 3,953,394 | 4/1976 | Fox et al. | 525/177 |
| 4,011,285 | 3/1977 | Seymour et al. | 525/92 |
| 4,090,996 | 5/1978 | Gergen et al. | 525/92 |
| 4,097,550 | 6/1978 | Haaf et al. | 260/876 B |
| 4,101,605 | 7/1978 | Gergen et al. | 525/92 |
| 4,119,607 | 10/1978 | Gergen et al. | 523/522 |
| 4,124,654 | 11/1978 | Abolins et al. | 260/876 B |
| 4,220,735 | 9/1980 | Dieck et al. | 525/90 |
| 4,243,766 | 1/1981 | Abolins et al. | 525/92 |
| 4,267,286 | 5/1981 | Campbell | 525/92 |
| 4,271,064 | 6/1981 | Dieck | 525/92 |
| 4,294,936 | 10/1981 | Korpman | 428/355 |

FOREIGN PATENT DOCUMENTS

| | | | |
|---|---|---|---|
| 1029145 | 4/1978 | Canada . | |
| 2053241 | 2/1981 | United Kingdom | 525/92 |

*Primary Examiner*—John C. Bleutge
*Assistant Examiner*—Herbert J. Lilling

[57] ABSTRACT

A thermoplastic molding composition having good low temperature properties in addition to low distortion at paint bake temperatures comprises the blend of a selectively hydrogenated monoalkenyl arene-conjugated diene block copolymer, a vinyl aromatic-α, β-unsaturated cyclic anhydride copolymer, and a thermoplastic polyester.

9 Claims, 1 Drawing Figure

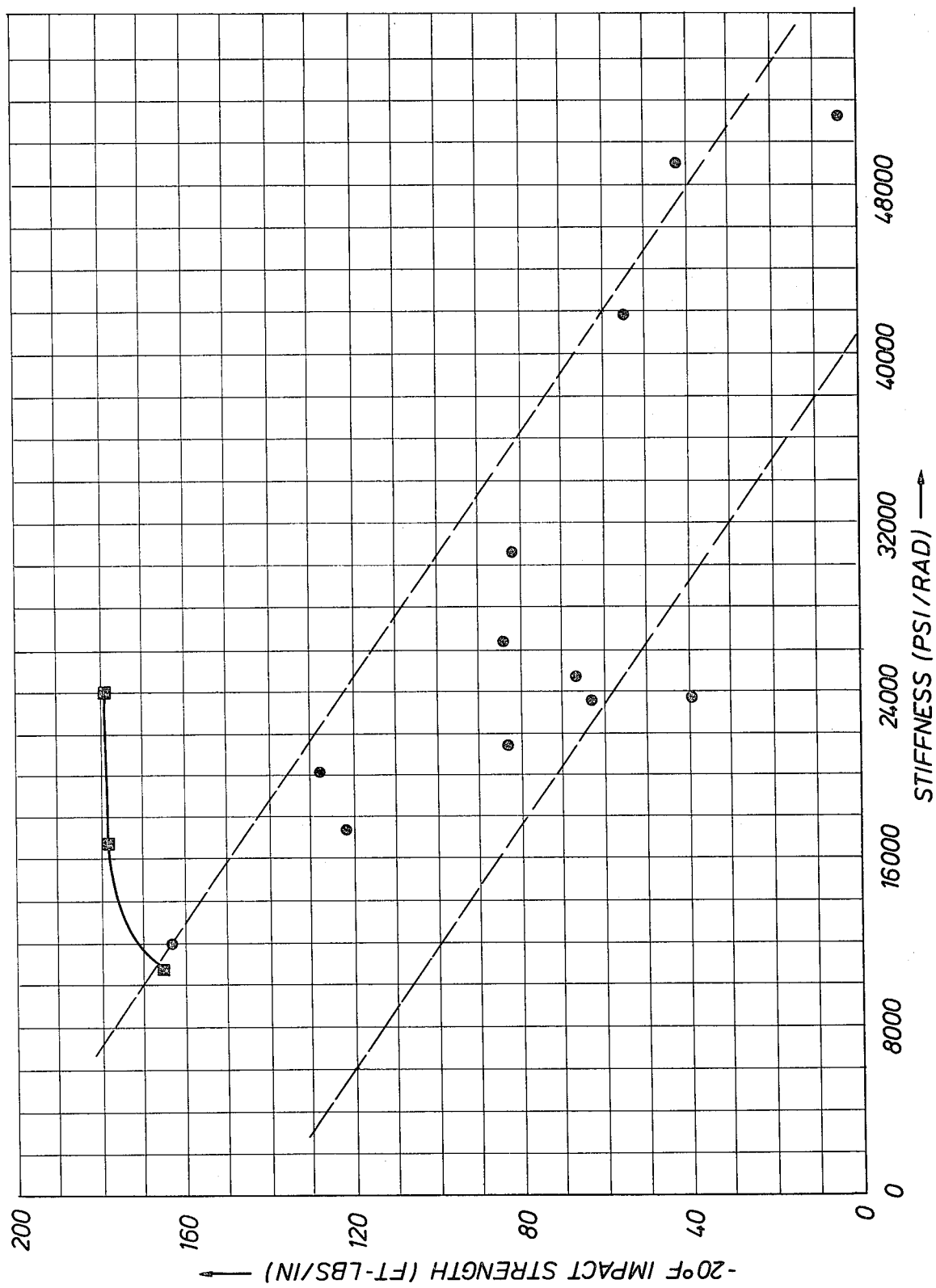

POLYMER BLEND COMPOSITION

BACKGROUND OF THE INVENTION

1. Field of the Invention

This invention relates to a polymer blend composition. More particularly, this invention relates to a polymer blend composition comprising a selectively hydrogenated block copolymer, a vinyl aromatic copolymer and a thermoplastic polyester.

2. Description of the Prior Art

Vinyl aromatic resins, such as polystyrene or high impact polystyrene have been found to be useful in thermoplastic molding compositions. However, such vinyl aromatic resins have poor heat distortion and impact resistance. One approach to improve these property deficiencies involves copolymerizing the vinyl aromatic with an $\alpha$, $\beta$-unsaturated cyclic anhydride, to form copolymers such as poly(styrene-maleic anhydride). Although such copolymers have improved heat resistance, the overall balance of properties is still inadequate.

In order to further improve the properties of such vinyl aromatic copolymers, various other polymers have been blended with the copolymer. For example, blends of nitrile rubber and styrene-maleic anhydride copolymers are disclosed in U.S. Pat. Nos. 2,914,505 and 3,641,212. Blends of styrene-maleic anhydride copolymers with radial styrene-diene block copolymers and an optional polyphenylene ether resin are disclosed in U.S. Pat. No. 4,097,550. Still further, blends of styrene-maleic anhydride copolymers, hydrogenated styrene-diene block copolymers and optional polyphenylene ether resins are disclosed in U.S. Pat. Nos. 4,124,654 and 4,243,766. Such polymer blend compositions are still not ideal. A new thermoplastic molding composition with an unexpectedly improved balance of properties has now been found.

SUMMARY OF THE INVENTION

The present invention is directed to a polymer blend composition having an unobvious balance of properties. In particular, the present invention is a thermoplastic molding composition comprising:

(a) from about 10 to about 85 percent by weight of a selectively hydrogenated block copolymer comprising at least two monoalkenyl arene polymer end blocks A and at least one substantially completely hydrogenated conjugated diene polymer mid block B, the weight percent of blocks A comprising between 8 and 65 percent by weight of said block copolymer;

(b) from about 10 to about 80 percent by weight of a vinyl aromatic copolymer comprising a vinyl aromatic compound and an $\alpha$, $\beta$-unsaturated cyclic anhydride; and (c) from about 10 to about 80 percent by weight of a thermoplastic polyester having a molecular weight in excess of about 20,000, a melting point over about 120° C., and which polyester is selected from the group consisting of a condensation product of a dicarboxylic acid and a glycol, polypivalolactone and polycaprolactone.

The compositions according to the invention are not only readily processable into parts, but possess good low temperature (−20° F.) properties. and are also directly paintable with commercial paints and have low distortion during the paint bake cycle (250° F., 30 minutes). Further, these compositions have excellent gloss, making them prime candidates for exterior automotive applications. It is significant that the compositions according to the invention are also less expensive than competitive materials in exterior automotive parts. Still further, as shown in the Illustrative Embodiments which follow, the impact/stiffness relationship shows unexpectedly that it is possible to even increase stiffness without reducing impact (at constant oil content).

BRIEF DESCRIPTION OF THE DRAWING

The drawing depicts impact/stiffness relationships of various polymer blends according to the invention.

DETAILED DESCRIPTION OF THE INVENTION

There are three major components in the polymer compositions of the present invention—a selectively hydrogenated block copolymer component, a vinyl aromatic copolymer component and a thermoplastic polyester component.

A. Selectively Hydrogenated Block Copolymer

The block copolymers employed in the present invention may have a variety of geometrical structures, since the invention does not depend on any specific geometrical structure, but rather upon the chemical constitution of each of the polymer blocks. Thus, the structures may be linear, radial or branched so long as each copolymer has at least two polymer end blocks A and at least one polymer mid block B as defined above. Methods for the preparation of such polymers are known in the art. Particular reference will be made to the use of lithium based catalysts and especially lithium-alkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with multifunctional coupling agents such as dihaloalkanes or -alkenes and divinyl benzene as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene (SBS)
polystyrene-polyisoprene-polystyrene (SIS)
poly(alpha-methylstyrene)-polybutadiene-poly(alpha-methylstyrene) and
poly(alpha-methylstyrene)-polyisoprene-poly(alpha-methylstyrene)

It will be understood that both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The term "monoalkenyl arene" will be taken to include especially styrene and its analogs and homologs including alpha-methylstyrene and ring-substituted styrenes, particularly ring-methylated styrenes. The preferred monoalkenyl arenes are styrene and alpha-methylstyrene, and styrene is particularly preferred. The blocks B may comprise homopolymers of butadiene or isoprene and copolymers of one of these two dienes with a monoalkenyl arene as long as the blocks B predominate in conjugated diene units. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles, a regular copolymer block of ethylene and butene-1 (EB). If the conjugated diene employed is isoprene, the resulting hydrogenated product is or resembles a regular copolymer block of ethylene and propylene (EP).

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

The average molecular weights of the individual blocks may vary within certain limits. In most instances, the monoalkenyl arene blocks will have number average molecular weights in the order of 5,000–125,000, preferably 7,000–60,000 while the conjugated diene blocks either before or after hydrogenation will have average molecular weights in the order of 10,000–300,000 preferably 30,000–150,000. The total average molecular weight of the block copolymer is typically in the order of 25,000 to about 250,000, preferably from about 35,000 to about 200,000. These molecular weights are most accurately determined by tritium counting methods or osmotic pressure measurements.

The proportion of the monoalkenyl arene blocks should be between about 8 and 65% by weight of the block copolymer, preferably between about 10 and 30% by weight.

While the average molecular weight of the individual blocks is not critical, at least within the above specified limits, it is useful to select the type and total molecular weight of the block copolymer in order to obtain the necessary mixing under the chosen blending conditions. Best results are obtained when the viscosity of the block copolymer and the other thermoplastic resins are substantially the same at the temperature used for blending and processing. In some instances, matching of the viscosity of the block copolymer portion and the resin portions are best achieved by using two or more block copolymers or resins. For example, a blend of two block copolymers having different molecular weights or a blend of a hydrogenated SBS and hydrogenated SIS polymers may be employed.

B. Vinylaromatic Copolymer

The copolymers of the vinyl aromatic compounds and the $\alpha, \beta$-unsaturated cyclic anhydride are well known and are described in the literature. The vinyl aromatic component may be derived from compounds of the formula:

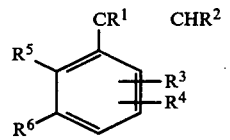

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred vinyl aromatic compound. The $\alpha, \beta$-unsaturated cyclic anhydrides include maleic anhydride, citraconic anhydride, itaconic anhydride, aconitic anhydride and the like. The preferred $\alpha, \beta$-unsaturated cyclic anhydride is maleic anhydride.

These polymers may comprise 40 to 1 mole percent of the $\alpha, \beta$-unsaturated cyclic anhydride and from 60 to 99 mole percent of a vinyl aromatic compound. The preferred polymers will contain about 25–5 mole percent of the $\alpha, \beta$-unsaturated cyclic anhydride and 75–95 mole percent of the vinyl aromatic compound. The preparation of these copolymers are described in U.S. Pat. Nos. 2,971,939; 3,336,267 and 2,769,804 which are hereby incorporated by reference. A much preferred copolymer is ARCO's Dylark ® 332 styrene-maleic anhydride copolymer, which is a styrene-maleic anhydride copolymer containing about 8 mole % maleic anhydride, the balance being styrene.

C. Thermoplastic Polyesters

The thermoplastic polyesters employed in the instant invention have a generally crystalline structure, a melting point over about 120° C., and are thermoplastic as opposed to thermosetting.

One particularly useful group of polyesters are those thermoplastic polyesters prepared by condensing a dicarboxylic acid or the lower alkyl ester, acid halide, or anhydride derivatives thereof with a glycol, according to methods well-known in the art.

Among the aromatic and aliphatic dicarboxylic acids suitable for preparing polyesters useful in the present invention are oxalic acid, malonic acid, succinic acid, glutaric acid, adipic acid, suberic acid, azelaic acid, sebacic acid, terephthalic acid, isophthalic acid, p-carboxypheroacetic acid, p,p'-dicarboxydiphenyl, p,p'-dicarboxydiphenyl, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p,p'-dicarboxydiphenylmethane, p,p-dicarboxydiphenylpropane, p,p'-dicarboxydiphenyloctane, 3-alkyl-4-($\beta$-carboxethoxy)-benzoic acid, 2,6-naphthalene dicarboxylic acid, 2,7-napthalene dicarboxylic acid, and the like. Mixtures of dicarboxylic acids can also be employed. Terephthalic acid is particularly preferred.

The glycols suitable for preparing the polyesters useful in the present invention include straight chain alkylene glycols of 2 to 12 carbon atoms such as ethylene glycol, 1,3-propylene glycol, 1,6-hexylene glycol, 1,10-decamethylene glycol, 1,12-dodecamethylene glycol and the like. Aromatic glycols can be substituted in whole or in part. Suitable aromatic dihydroxy compounds include p-xylylene glycol, pyrocatechol, resorcinol, hydroquinone, or alkyl-substituted derivatives of these compounds. Another suitable glycol is 1,4-cyclohexane dimethanol. Much preferred glycols are the straight chain alkylene glycols having 2 to 4 carbon atoms.

A preferred group of polyesters are poly(ethylene terephthalate), poly(propylene terephthalate), and poly(butylene terephthalate). A much preferred polyester is poly(butylene terephthalate). Poly(butylene terephthalate), a crystalline copolymer, may be formed by the polycondensation of 1,4-butanediol and dimethyl-terephthalate or terephthalic acid, and has the generalized formula:

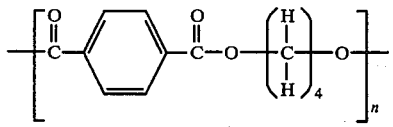

where n varies from 70 to 140. The molecular weight of the poly (butylene terephthalate) typically varies from about 20,000 to about 25,000. A suitable process for manufacturing the polymer is disclosed in British Pat. No. 1,305,130.

Commercially available poly(butylene terephthalate) is available from General Electric under the tradename VALOX ® thermoplastic polyester. Other commercial polymers include CELANEX ® from Celenese, TENITE ® from Eastman Kodak, and VITUF ® from Goodyear Chemical.

Another useful polyester is polypivalolactone. Polypivalolactone is a linear polymer having recurring ester structural units mainly of the formula:

—CH$_2$—C(CH$_3$)$_2$C(O)O— i.e., units derived from pivalolactone. Preferably the polyester is a pivalolactone homopolymer. Also included, however, are the copolymers of pivalolactone with not more than 50 mole percent, preferably not more than 10 mole percent of other beta-propiolactones, such as beta-propiolactone, alpha, alpha-diethyl-beta-propiolactone and alpha-methyl-alpha-ethyl-beta-propiolactone. The term "beta-propiolactones" refers to beta-propiolactone (2-oxetanone) and to derivatives thereof which carry no substitutes at the beta-carbon atoms of the lactone ring. Preferred beta-propiolactones are those containing a tertiary or quaternary carbon atom in the alpha position relative to the carbonyl group. Especially preferred are the alpha, alpha-dialkyl-beta-propiolactones wherein each of the alkyl groups independently has from one to four carbon atoms. Examples of useful monomers are:
alpha-ethyl-alpha-methyl-beta-propiolactone,
alpha-methyl-alpha-isopropyl-beta-propiolactone,
alpha-ethyl-alpha-n-butyl-beta-propiolactone,
alpha-chloromethyl-alpha-methyl-beta-propiolactone,
alpha, alpha-bis(chloromethyl)-beta-propiolactone, and
alpha, alpha-dimethl-beta-propiolactone (pivalolactone).

See generally U.S. Pat. Nos. 3,259,607; 3,299,171; and 3,579,489. These polypivalolactones have a molecular weight in excess of 20,000 and a melting point in excess of 120° C.

Another useful polyester is polycaprolactone. Typical poly(ε-caprolactones) are substantially linear polymers in which the repeating unit is

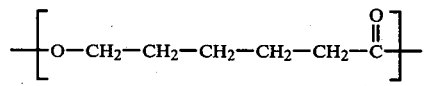

These polymers have similar properties to the polypivalolactones and may be prepared by a similar polymerization mechanism. See generally U.S. Pat. No. 3,259,607.

D. Additional Components

The polymer blends of the instant invention may be compounded further with other polymers, oils, fillers, reinforcements, antioxidants, stabilizers, fire retardants, antiblocking agents and other rubber and plastic compounding ingredients without department from the scope of this invention.

In some cases these may be advantages for adding certain hydrocarbon oils. The types of oils useful in the practice of this invention are those polymer extending oils ordinarily used in the processing of rubber and plastics, e.g. rubber compounding oils. Especially preferred are the types of oil that are compatible with the elastomeric segment of the block copolymer. While oils of higher aromatics content are satisfactory, those petroleum-based white oils having low volatility and less than 50% aromatics content as determined by the clay gel method of tentative ASTM method D 2007 are particularly preferred. The oils should additionally have low volatility, preferably having an initial boiling point above 500° F.

Examples of various fillers that can be employed are in the 1971-1972 Modern Plastics Encyclopedia, pages 240-247. Reinforcements are also very useful in the present polymer blends. A reinforcement may be defined simply as the material that is added to a resinous matrix to improve the strength of the polymer. Most of these reinforcing materials are inorganic or organic products of high molecular weight. Various examples include glass fibers asbestos, boron fibers, carbon and graphite fibers, whiskers, quartz and silica fibers, ceramic fibers, metal fibers natural organic fibers, and synthetic organic fibers. Especially preferred are reinforced polymer blends of the instant invention containing about 2 to about 80 percent by weight based on the total weight of the resulting reinforced blend.

E. Mixing Conditions

The relative proportions of the polymers and oil are presented below in percent by weight:

|  | Preferred | More Preferred |
| --- | --- | --- |
| Selectively hydrogenated block copolymer | 10 to 85 | 30 to 70 |

|  | Preferred | More Preferred |
|---|---|---|
| Vinyl aromatic copolymer | 10 to 80 | 15 to 40 |
| Thermoplastic polyester | 10 to 80 | 15 to 40 |
| Hydrocarbon oil | 0 to 30 | 1 to 10 |

The blending of the various polymer components may be done in any manner that produces a blend which will not delaminate on processing. For example, the various polymers may be dissolved in a solvent common for all and coagulated by admixing in a solvent in which none of the polymers are soluble. But more preferably, a particularly useful procedure is to intimately mix the polymers in the form of granules and/or powder in a high shear mixer. Intimate mixing is typically achieved by employing high shear extrusion compounding machines such as twin screw compounding extruders and thermoplastic extruders having at least a 20:1 L/D ratio and a compression ratio of 3 or 4:1.

The mixing or processing temperature (Tp) is selected in accordance with the particular polymers to be blended. For example, when melt blending the polymers instead of solution blending, it will be necessary to select a processing temperature above the melting point of the highest melting point polymer. In addition, the processing temperature may also be chosen so as to permit the isoviscous mixing of the polymers. Typically, the mixing or processing temperature is between about 200° C. and about 350° C. For blends containing poly(butylene terephthalate) Tp is preferably between about 240° C. and about 300° C.

The polymer blends of the instant invention can be employed in any use typically performed by engineering thermoplastics, such as metal replacement and those areas where high performance is necessary. A particularly useful end use area is for exterior decorated automotive applications.

To illustrate the instant invention, the following illustrative embodiments are given. It is to be understood, however, that the embodiments are given for the purpose of illustration only and the invention is not to be regarded as limited to any of the specific materials or conditions used in the specific embodiments.

The physical test methods used in evaluation of the blends appearing in Tables Ia and Ib of the application are as follows:
−20° F. Cold Impact Strength—Gardner Impact Test
Stiffness—Tinius Olsen Stiffness Test, ASTM D-747
Hardness—Shore Durometer, Type D-2, both instantaneous and 10-second reading are given.
Angle Tear—Die C, ASTM D-624
Tensile Properties—Die D, ASTM D-412
Paint Adhesion Tests—Cross-Hatch tape adhesion test per Ford method BI 6-I

ILLUSTRATIVE EMBODIMENT #1

In illustrative Embodiment #1, various polymer blends were prepared. All blends except blends 2669, 2685, 2686, 2687, and 2688 are according to the invention. The blends according to the invention were prepared by first dry blending the various component particles, and then extruding the resulting mixture in a Werner-Pflederer extruder at a temperature above about 465° F.

The three block copolymer components are selectively hydrogenated SBS block copolymers, which polymers are according to the invention and which vary in molecular weight and percent styrene. Two different styrene-maleic anhydride copolymers were employed. SMA #1 is Dylark 232 and SMA #2 is Dylark 332. These differ by the percentage of maleic anhydride incorporated into the copolymer, Dylark 232 possessing the lower amount of maleic anhydride. Some of the blends contain other components such as a hydrocarbon rubber extending oil, and EPDM rubber (ethylene-propylene-diene monomer terpolymer) or an LDPE resin (low density polyethylene). All blends contain a standard antioxidant. The various formulations and resulting properties are presented below in Tables 1a and 1b. As shown in the tables, binary resin blends of block copolymers and SMA #1 copolymers (Blends: 2669, 2685, 2686, 2687, and 2688) possessed excellent cold impact strength at high stiffness, and were found to be directly paintable with a commercial elastomeric enamel paint (PPG Industries, Durethane 101). However, these binary blends were not capable of withstanding a 30 minute, 250° F. bake cycle, required for curing the paint system without distortion. Significant improvements in the heat resistance of the compounds were found with the addition of PBT resin (Blends: 2701, 2702) and a filler (Blend 2703) into the polymeric compound.

Heat resistant compounds were found through incorporation of a higher percentage maleic anhydride SMA (SMA #2) copolymer (Blends: 2713, 2714, 2744). Variations of the stiffness, impact strength, and the other physical properties were made through additions of oil (Blends: 2721, 2722, 2723, 2745, 2746, 2784, 2785, and 2786), EPDM (Blends: 2724, 2725, 2747, and 2748) and LDPE (Blends: 2721, 2722, and 2723). In all cases, excellent heat resistance during the 250° F., 30 minute bake cycle, along with direct paint adhesion was found.

Some of the data are also presented in the attached drawing. The drawing depicts cold impact strength versus stiffness relationships of the SMA/PBT/block copolymer blends. One series is at a constant oil content of 5% (represented by the closed squares) varying the stiffness of the compound by replacing block copolymer in the compound with SMA/PBT resin (Blends 2785, 2746, and 2786). The solid circles represent the other SMA/PBT/block polymer blends with and without oil. The binary blends of SMA and block polymer (2669 to 2688) and the two blends containing EPDM (2747 and 2748) have been omitted. Although all of the compounds in the drawing possess excellent cold impact strength, the impact strength is observed to decrease with increasing stiffness within the compositional series. All of the blends are approximately bounded by two dashed lines of negative slope. An unexpected result is the constant impact strength exhibited by the 5% oil system at high stiffness, even though the blends possess lower concentrations of block copolymer than their unoiled counterparts at similar stiffness.

TABLE 1a

| Blend Number | 2669 | 2685 | 2686 | 2687 | 2688 | 2701 | 2702 | 2703 |
|---|---|---|---|---|---|---|---|---|
| Formulation (percent by weight) | | | | | | | | |
| Block Copolymer #1 | 18 | — | — | — | 36 | 30 | 30 | 18 |
| Block Copolymer #2 | 42 | — | — | — | 24 | 20 | 20 | 12 |

TABLE 1a-continued

| Blend Number | 2669 | 2685 | 2686 | 2687 | 2688 | 2701 | 2702 | 2703 |
|---|---|---|---|---|---|---|---|---|
| Block Copolymer #3 | — | 60 | 48 | 36 | — | — | — | — |
| SMA #1 | 40 | 40 | 32 | 24 | 40 | 40 | 30 | 18 |
| SMA #2 | — | — | — | — | — | — | — | — |
| $CaCO_3$ | — | — | 20 | 40 | — | — | — | 40 |
| PBT | — | — | — | — | — | 10 | 20 | 12 |
| Oil | — | — | — | — | — | — | — | — |
| EPDM | — | — | — | — | — | — | — | — |
| LDPE | — | — | — | — | — | — | — | — |
| Properties | | | | | | | | |
| −20° F. Cold Impact Strength (ft-lbs/in) | 133 | 133 | 67 | 39 | 32 | 42 | 54 | 4 |
| Stiffness (psi/rad) | 34,969 | 23,457 | 21,870 | 27,466 | 31,520 | 49,039 | 41,718 | 51,135 |
| Hardness (Shore "D") | 54/51 | 52/46 | 49/43 | 50/47 | 53/47 | 60/53 | 56/53 | 56/51 |
| Angle tear (pli) | 538 | 514 | 441 | 399 | 477 | 588 | 616 | 482 |
| Tensile Break 11 (psi) | 2525 | 2650 | 2650 | 2213 | 2475 | 2788 | 2775 | 2550 |
| Break 1 (psi) | 3475 | 3650 | 2875 | 1888 | 2238 | 2325 | 2900 | 2150 |
| % elongation 11 | 170 | 210 | 190 | <100 | 140 | 100 | 170 | <100 |
| % elongation 1 | 370 | 420 | 330 | 230 | 260 | 180 | 310 | <100 |
| Direct Paint Adhesion Test | P | P | P | P | P | P | P | P |
| Bake cycle 30 min. 250° F. | F | F | F | F | F | F/P | F/P | P |
| Paint Adhesion Test Following 10 day watersoak @ 100° F. | — | — | — | — | — | P | P | P |

TABLE 1b

| Blend Number | 2713 | 2714 | 2721 | 2722 | 2723 | 2724 | 2725 | 2744 |
|---|---|---|---|---|---|---|---|---|
| Formulation (percent by weight) | | | | | | | | |
| Block Copolymer #1 | 36 | 36 | 32.4 | 31.2 | 30 | 27 | 30 | 60 |
| Block Copolymer #2 | 24 | 24 | 21.6 | 20.8 | 20 | 18 | 20 | — |
| Block Copolymer #3 | — | — | — | — | — | — | — | — |
| SMA #1 | — | — | — | — | — | — | — | — |
| SMA #2 | 30 | 20 | 20 | 20 | 20 | 20 | 20 | 20 |
| $CaCO_3$ | — | — | — | — | — | — | — | — |
| PBT | 10 | 20 | 20 | 20 | 20 | 20 | 20 | 20 |
| Oil | — | — | 1 | 3 | 3 | — | — | — |
| EPDM | — | — | — | — | — | 15 | 10 | — |
| LDPE | — | — | 5 | 5 | 7 | — | — | — |
| Properties | | | | | | | | |
| −20° F. Cold Impact Strength (ft-lbs/in) | 82 | 84 | 100 | 67 | 39 | 64 | 122 | 83 |
| Stiffness (psi/rad) | 30,590 | 26,415 | 23,878 | 24,767 | 23,749 | 23,311 | 17,551 | 21,568 |
| Hardness (Shore "D") | 49/44 | 46/44 | 49/46 | 53/46 | 50/43 | 45/39 | 42/36 | 48/44 |
| Angle tear (pli) | 445 | 447 | 400 | 398 | 385 | 309 | 333 | 593 |
| Tensile Break 11 (psi) | 2488 | 3025 | 2375 | 2125 | 1950 | 1600 | 1500 | 3175 |
| Break 1 (psi) | 2675 | 3375 | 1975 | 1750 | 1650 | 1225 | 1400 | 2400 |
| % elongation 11 | 130 | 290 | 230 | 180 | 150 | 80 | 80 | 390 |
| % elongation 1 | 330 | 370 | 230 | 200 | 190 | 80 | 130 | 360 |
| Direct Paint Adhesion Test | P | P | P | P | P | P | P | P |
| Bake cycle 30 min. 250° F. | P | P | P | P | P | P | P | P |
| Paint Adhesion test following 10 day watersoak @ 100° F. | P | P | P | P | P | P | P | P |

| Blend Number | 2745 | 2746 | 2747 | 2748 | 2784 | 2785 | 2786 |
|---|---|---|---|---|---|---|---|
| Formulation (percent by weight) | | | | | | | |
| Block Copolymer #1 | 58.2 | 57 | 55 | 50 | 54 | 66.6 | 47.6 |
| Block Copolymer #2 | — | — | — | — | — | — | — |
| Block Copolymer #3 | — | — | — | — | — | — | — |
| SMA #1 | — | — | — | — | — | — | — |
| SMA #2 | 19.4 | 19 | 20 | 20 | 18 | 14.2 | 23.8 |
| $CaCO_3$ | — | — | — | — | — | — | — |
| PBT | 19.4 | 19 | 20 | 20 | 18 | 14.2 | 23.8 |
| Oil | 3.0 | 5 | — | — | 10 | 5 | 5 |
| EPDM | — | — | 5 | 10 | — | — | — |
| LDPE | — | — | — | — | — | — | — |
| Properties | | | | | | | |
| −20° F. Cold Impact Strength (ft-lbs/in) | 128 | 178 | 122 | 156 | 164 | 166 | 178 |
| Stiffness (psi/rad) | 20,092 | 16,803 | 23,688 | 22,500 | 12,164 | 10,851 | 24,140 |
| Hardness (Shore "D") | 45/42 | 41/38 | 48/43 | 45/40 | 37/33 | 39/35 | 46/43 |
| Angle tear (pli) | 630 | 483 | 643 | 503 | 388 | 425 | 533 |
| Tensile Break 11 (psi) | 2825 | 2475 | 2350 | 1975 | 1475 | 2425 | 2425 |
| Break 1 (psi) | 2975 | 2700 | 2775 | 2200 | 1500 | 2825 | 1550 |
| % elongation 11 | 455 | 400 | 305 | 200 | 300 | 370 | 290 |
| % elongation 1 | 440 | 515 | 460 | 400 | 410 | 520 | 120 |
| Direct Paint Adhesion Test | P | P | P | P | P | P | P |
| Bake cycle 30 min. 250° F. | P | P | P | P | P | P | P |
| Paint Adhesion test following | | | | | | | |

TABLE 1b-continued

| 10 day watersoak @ 100° F. | P | P | P | P | P | P | P |

What is claimed is:

1. A thermoplastic molding composition comprising:
   (a) from about 10 to about 85 percent by weight of a selectively hydrogenated block copolymer comprising at least two monoalkenyl arene polymer end blocks A and at least one substantially completely hydrogenated conjugated diene polymer mid block B, the weight percent of blocks A comprising between 8 and 65 percent by weight of said block copolymer wherein at least 80% of the aliphatic double bonds in block B are hydrogenated and no more than about 25% of the alkenyl aromatic double bonds in blocks A are hydrogenated;
   (b) from about 10 to about 80 percent by weight of a vinyl aromatic copolymer comprising a vinyl aromatic compound and an $\alpha$, $\beta$-unsaturated cyclic anhydride; and
   (c) from about 10 to about 80 percent by weight of a thermoplastic polyester having a molecular weight in excess of about 20,000, a melting point over about 120° C., and which polyester is selected from the group consisting of a condensation product of a dicarboxylic acid and a glycol, polypivalolactone and polycaprolactone.

2. The composition of claim 1 wherein said selectively hydrogenated block copolymer is a linear ABA block copolymer.

3. The composition of claim 1 wherein said selectively hydrogenated block copolymer is a radial $(AB)_x$ BA block copolymer.

4. The composition of claim 1 or claim 2 wherein said vinyl aromatic copolymer is a styrene-maleic anhydride copolymer.

5. The composition of claim 1 wherein said thermoplastic polyester is prepared by condensing a dicarboxylic acid with a glycol.

6. The composition of claim 5 wherein said thermoplastic polyester is poly(butylene terephthalate).

7. The composition of claim 4 wherein said thermoplastic polyester is poly(butylene terephthalate).

8. The composition according to claim 1 also containing 0 to 30 percent by weight of a hydrocarbon extending oil.

9. The composition according to claim 8 wherein the relative amounts of each component are:
   (a) about 30 to about 70 weight percent block copolymer,
   (b) about 15 to about 40 weight percent vinyl aromatic copolymer,
   (c) about 15 to about 40 weight percent thermoplastic polyester, and
   (d) about 1 to about 10 weight percent hydrocarbon extending oil.

* * * * *